(12) United States Patent
Huber et al.

(10) Patent No.: US 7,529,068 B2
(45) Date of Patent: May 5, 2009

(54) PROTECTIVE CIRCUIT FOR A FREQUENCY CONVERTER

(75) Inventors: Norbert Huber, Teisendorf (DE); Simon Graf, Burgkirchen (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 380 days.

(21) Appl. No.: 11/114,705

(22) Filed: Apr. 25, 2005

(65) Prior Publication Data
US 2005/0237679 A1 Oct. 27, 2005

(30) Foreign Application Priority Data
Apr. 26, 2004 (DE) .................. 10 2004 020 521
May 19, 2004 (DE) .................. 10 2004 024 933

(51) Int. Cl.
*H02H 7/00* (2006.01)
(52) U.S. Cl. .................. 361/18; 320/157; 320/166; 324/433
(58) Field of Classification Search .......... 361/18, 361/15; 320/166, 157; 324/433
See application file for complete search history.

(56) References Cited

U.S. PATENT DOCUMENTS

| | | | |
|---|---|---|---|
| 4,894,745 A | 1/1990 | Akagawa et al. | |
| 5,570,277 A * | 10/1996 | Ito et al. | 363/19 |
| 5,726,849 A | 3/1998 | Nakamura | |
| 5,978,195 A * | 11/1999 | Goder et al. | 361/94 |
| 6,344,959 B1 * | 2/2002 | Milazzo | 361/92 |
| 6,744,644 B2 * | 6/2004 | Kojori | 363/49 |
| 6,804,127 B2 * | 10/2004 | Zhou | 363/37 |
| 2002/0012261 A1 | 1/2002 | Moindron | |
| 2002/0167223 A1 * | 11/2002 | Yamazaki | 307/9.1 |
| 2003/0218838 A1 * | 11/2003 | Poulsen | 361/23 |

FOREIGN PATENT DOCUMENTS

| | | |
|---|---|---|
| EP | 0 477 367 | 4/1992 |
| EP | 1 176 688 | 1/2002 |
| JP | 05115101 A * | 5/1993 |
| JP | 11339986 | * 10/1999 |

OTHER PUBLICATIONS

Abstract for JP 05-115101. Oct. 23, 1991.*
Search Report, European Application No. EP 05 00 2569, dated Jan. 27, 2009.

* cited by examiner

*Primary Examiner*—Stephen W Jackson
*Assistant Examiner*—Christopher J Clark
(74) *Attorney, Agent, or Firm*—Kenyon & Kenyon LLP

(57) ABSTRACT

The voltage of the intermediate circuit of a frequency converter is monitored, while the intermediate circuit is charged via charging resistors. When the voltage has not reached at least a reference voltage during a specific time constant, the charging process is interrupted prematurely. The reference voltage is selected to be considerably lower than the operating voltage of the intermediate circuit. The reference voltage may be less than half of the operating voltage of the intermediate circuit.

12 Claims, 1 Drawing Sheet

PROTECTIVE CIRCUIT FOR A FREQUENCY CONVERTER

CROSS-REFERENCE TO RELATED APPLICATIONS

The present application claims priority to application Ser. No. 10 2004 020 521.3, filed in the Federal Republic of Germany on Apr. 26, 2004, and to application Ser. No. 10 2004 024 933.4, filed in the Federal Republic of Germany on May 19, 2004, each of which is expressly incorporated herein in its entirety by reference thereto.

FIELD OF THE INVENTION

The present invention relates to a protective circuit for a frequency converter.

BACKGROUND INFORMATION

A frequency converter is used for converting alternating current of fixed frequency, as it is drawn, for example, from a supply network, to an alternating current of variable frequency, for operating a motor.

A frequency converter has a rectifier circuit, a post-connected, intermediate circuit or link having an intermediate-circuit capacitor or link capacitor, and a post-connected inverter.

When switching on the frequency converter, the intermediate-circuit capacitor must first be charged. In this instance, very high currents may flow when insufficient measures are taken to limit these currents, for in the uncharged state, the intermediate-circuit capacitor acts as a short circuit.

Therefore, charging resistors are used which limit the charging current. These charging resistors may only be bypassed after the charging of the intermediate-circuit capacitor is at least substantially complete.

The charging current becomes smaller and smaller during the charging process, when the intermediate-circuit capacitor continuously charges.

In order to complete the charging of the intermediate-circuit capacitor as rapidly as possible, the charging resistors should be sized to be as small as possible. Therefore, it is possible for them to allow currents, which may produce a considerably high power loss in the resistors.

At the end of the charging process, it may be checked if the intermediate circuit or link has reached its required voltage. In this instance, the charging resistors are bypassed. Otherwise, the frequency converter is removed from the supply network or switched off.

If the intermediate circuit cannot be charged, since an intermediate-circuit short circuit or a high discharging current is present, this means that the charging resistors must withstand a considerably greater power loss, i.e., that the charging resistors burn out.

SUMMARY

An example embodiment of the present invention may provide a simple and cost-effective circuit, which protects the charging resistors for charging the intermediate-circuit capacitors and therefore allows these charging resistors to be sized in an optimum manner.

According to an example embodiment of the present invention, a protective circuit for a frequency converter includes: an intermediate-circuit capacitor; a voltage monitor device configured to monitor a voltage of the intermediate-circuit capacitor during a charge process; and an arrangement adapted to end the charge process if a reference voltage substantially less than an operating voltage of the intermediate circuit capacitor is not reached.

The reference voltage may be less than half of the operating voltage.

The arrangement may include a first monoflop having a first time constant and a second monoflop having a second time constant, and inputs of the first monoflop and the second monoflop may be connected to a charge signal.

The second time constant may be substantially less than the first time constant.

Outputs of the first monoflop and the second monoflop may be linked to second switch elements to charge the intermediate-circuit capacitor via charge resistors to proceed with the charge process without any further condition for a duration of the second time constant after appearance of the charge signal.

The outputs of the first monoflop and the second monoflop may be linked to the second switch elements to continue the charge process, after elapse of the second time constant, only up to an expiration of the first time constant when the voltage of the intermediate-circuit capacitor is greater than the reference voltage.

The protective circuit may include: a comparator, the voltage of the intermediate-circuit capacitor and the reference voltage connected to inputs of the comparator; and an OR gate, an output of the comparator and an output of the second monoflop connected to an input of the OR gate.

The protective circuit may include an AND gate. An output of the OR gate and an output of the first monoflop may be connected to inputs of the AND gate, and an output of the AND gate may be adapted to control the second switch elements.

The voltage monitor device may be adapted to check whether the operating voltage of the intermediate-circuit capacitor has been reached after elapse of the first time constant.

The second time constant may be approximately one-tenth of the first time constant.

The first time constant may be 1 second, and the second time constant may be 0.1 seconds.

According to an example embodiment of the present invention, a protective circuit for a frequency converter includes: intermediate-circuit capacitor means; means for monitoring a voltage of the intermediate-circuit capacitor means during a charging process; and means for ending the charging process if a reference voltage substantially less than an operating voltage of the intermediate circuit capacitor means is not reached.

Further aspects hereof and details pertaining thereto are described below in the following description of example embodiments with reference to the appended FIGURE.

DETAILED DESCRIPTION

Figure 1:
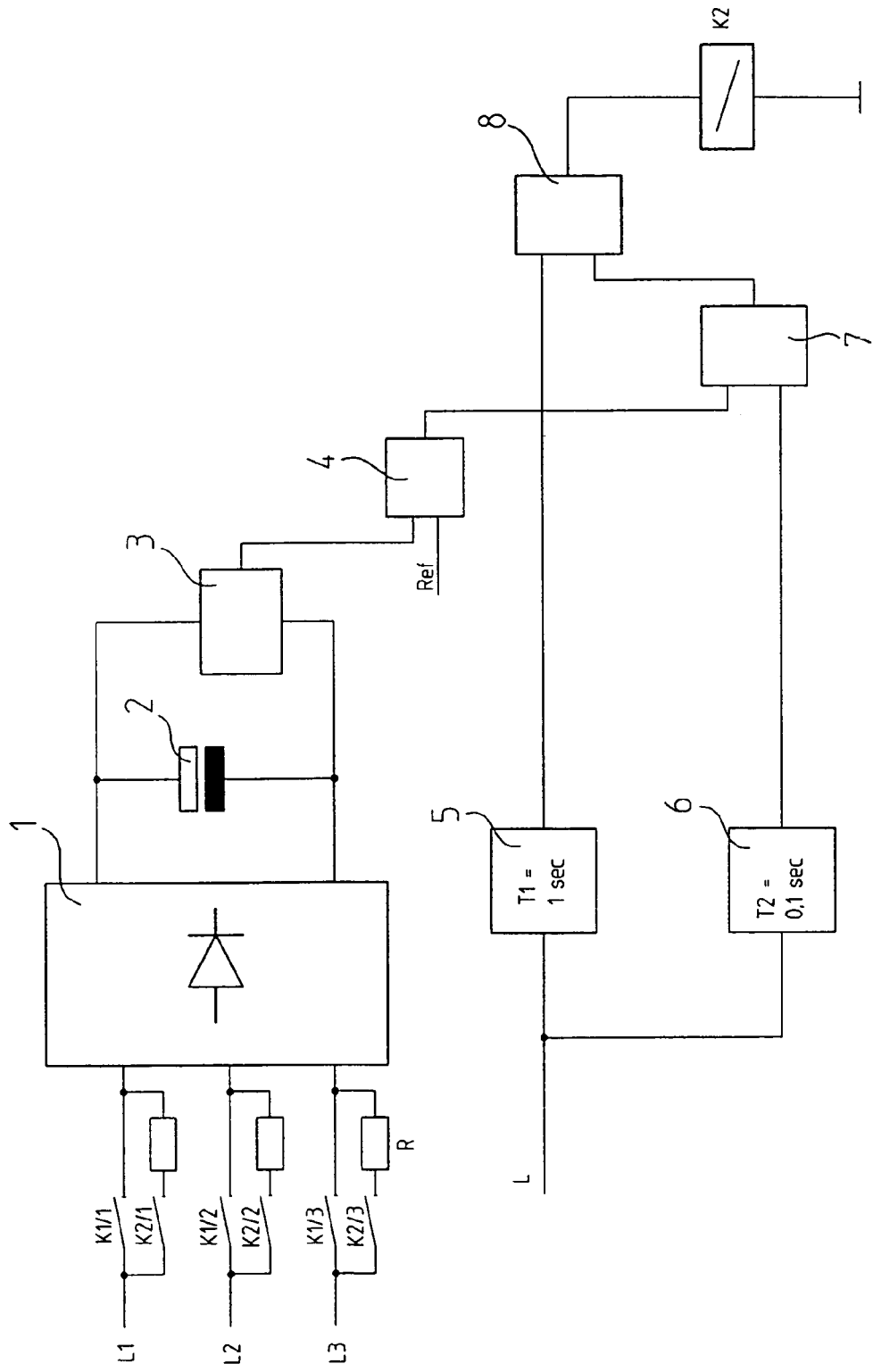
FIG. 1 illustrates a protective circuit for a frequency converter.

In FIG. 1, it is illustrated that phases L1, L2, L3 of a supply network are directly connected to a rectifier 1 by first switching elements K/1, K1/2, K1/3, respectively. Second switching elements K2/1, K2/2, K2/3 connect the supply network to rectifier 1 via charging resistors R.

The intermediate circuit having its intermediate-circuit capacitor 2 is connected in outgoing circuit to rectifier 1. A subsequent inverter and a motor connected to it (not illustrated in FIG. 1) are also provided.

In order to charge intermediate-circuit capacitor 2, second switching elements K2/1, K2/2, K2/3 are closed. Example embodiments of the present invention make use of the fact that at the start of resistance charging, the intermediate-circuit voltage increases according to an e-function. The charging initially takes place very rapidly and then more and more slowly. After the intermediate-circuit voltage has reached approximately 87% of the final voltage, the charging curve attenuates further, since during the rectification of the network, a ripple voltage is produced and the charging at the end and beyond only continues to take place during the voltage maxima. Therefore, the intermediate circuit has already reached a considerably high voltage, e.g., half of its operating voltage, after a short period of time. Example embodiments of the present invention may make use of this characteristic curve of the intermediate-circuit voltage by controlling or checking the curve at a very early time and may only continue the charging process, when the intermediate-circuit voltage has reached a reference value by then.

The protective circuit includes the following features, the interconnection configuration of which is illustrated in FIG. 1:

A voltage-measuring circuit 3 transmits a signal proportional to the intermediate-circuit voltage to a comparator 4, which compares the intermediate-circuit voltage to a reference voltage Ref.

A charging signal, which starts the charging process, may be applied to an input of the protective circuit. This charging signal L triggers a first monoflop 5 and a second monoflop 6. First time constant T1 of first monoflop 5 is selected to be so large, that in the normal case, intermediate-circuit capacitor 2 is almost completely charged after this time constant has elapsed. Typical values include T1=1 second, during which intermediate-circuit capacitor 2 charges to approximately 565 volts. Second time constant T2 of the second monoflop is selected so that the intermediate circuit already reaches a certain voltage. Typical values include T2=0.1 seconds, during which intermediate-circuit capacitor 2 charges to approximately 200 volts. Therefore, the charging curve is already checked at this time T2 after the start of the charging, thereby allowing a rapid reaction to a possible fault.

The outputs of comparator 4 and second monoflop 6 are connected to the inputs of an OR gate 7. This OR gate 7 only emits a switching signal, when no more than time constant T2 of second monoflop 6 has elapsed since charging signal L and/or the intermediate-circuit voltage is greater than reference voltage Ref.

The output of first monoflop 5 is connected, together with the output of OR gate 7, to the inputs of an AND gate 8, the output of which controls second switching element K2.

Therefore, the circuit causes second switching element K2 to be closed after the occurrence of a charging signal L, and a charging process is started (K2 is closed). If the intermediate-circuit voltage reaches reference voltage Ref after time constant T2 of second monoflop 6 has elapsed, then second switching elements K2 remain closed (due to OR gate 7), and the charging process is continued.

AND gate 8 ends the charging process either already after time constant T2 of second monoflop 6 has elapsed (e.g., when reference voltage Ref has not been reached by then), or, at the latest, after first time constant T1 of first monoflop 5 has elapsed. This is achieved by AND gate 8.

After the charging process has been successfully concluded, first switching elements K/1, K1/2, K1/3, e.g., a master contactor, may be closed. To this end, it may be provided to use a further protective circuit to check if the full operating voltage of the intermediate circuit has been reached.

Therefore, by monitoring the intermediate-circuit voltage, the protective circuit may allow a failure of the charging process to be detected at a very early time and the charging process to be aborted in a timely manner.

Appendix

Sample Calculation:
Network voltage 3×400 V~
Intermediate-circuit voltage 565 V=
Intermediate-circuit capacitance 2 mF
Charging resistors 3×10 Ohm
Energy loss in the resistors $1/2CU^2$=319 Ws
(when the intermediate circuit is correctly charged)

In the event of a short circuit in the intermediate circuit, an energy loss of $3\times((230V)^2/10\,Ohm)$=15,870 Ws results when the maximum charging time is one second.

When a circuit as described herein is used, an energy loss of 15,870*0.1=1,587 Ws results when the charging is interrupted after 0.1 seconds.

What is claimed is:

1. A protective circuit for a frequency converter, comprising:
    an intermediate-circuit capacitor;
    a voltage monitor device configured to monitor a voltage of the intermediate-circuit capacitor during a charge process; and
    an arrangement adapted to end the charge process if a reference voltage substantially less than an operating voltage of the intermediate circuit capacitor is not reached after a time period, beginning at a start of the charge process, has elasped that is substantially shorter than a time required by the intermediate circuit capacitor to reach a full charge;
    wherein the arrangement includes a first monoflop having a first time constant and a second monoflop having a second time constant, inputs of the first monoflop and the second monoflop connected to receive a charge signal.

2. The protective circuit according to claim 1, wherein the reference voltage is less than half of the operating voltage.

3. The protective circuit according to claim 1, wherein the second time constant is substantially less than the first time constant.

4. The protective circuit according to claim 1, wherein outputs of the first monoflop and the second monoflop are linked to switch elements to charge the intermediate-circuit capacitor via charge resistors to proceed with the charge process without any further condition for a duration of of the second time constant after appearance of the charge signal.

5. The protective circuit according to claim 4, wherein the outputs of the first monoflop and the second monoflop are linked to the switch elements to continue the charge process, after elapse of the second time constant, only up to an expiration of the first time constant when the voltage of the intermediate-circuit capacitor is greater than the reference voltage.

6. The protective circuit according to claim 5, further comprising:
    a comparator, the voltage of the intermediate-circuit capacitor and the reference voltage connected to inputs of the comparator; and an OR gate, an output of the comparator and an output of the second monoflop connected to an input of the OR gate.

7. The protective circuit according to claim 6, further comprising an AND gate, an output of the OR gate and an output of the first monoflop connected to inputs of the AND gate, an output of the AND gate adapted to control the switch elements.

8. The protective circuit according to claim 1, wherein the voltage monitor device is adapted to check whether the operating voltage of the intermediate-circuit capacitor has been reached after elapse of the first time constant.

9. The protective circuit according to claim 1, wherein the second time constant is approximately one-tenth of the first time constant.

10. The protective circuit according to claim 1, wherein the first time constant is 1 second and the second time constant is 0.1 seconds.

11. A protective circuit for a frequency converter, comprising:
  intermediate-circuit capacitor means;
  means for monitoring a voltage of the intermediate-circuit capacitor means during a charging process; and
  means for ending the charging process if a reference voltage substantially less than an operating voltage of the intermediate circuit capacitor means is not reached after a time period, beginning at a start of the charge process, has elasped that is substanially shorter than a time required by the intermediate circuit capacitor to reach full charge;
  wherein the means for ending the charging process includes a first monoflop having a first time constant and a second monoflop having a second time constant, inputs of the first monoflop and the second monoflop connected to receive a charge signal.

12. A method, comprising:
  monitoring a voltage of an intermediate-circuit capcitor of a protective circuit for a frequency converter during a charge process; and
  ending the charge process if a reference voltage substantially less than an operating voltage of the intermediate circuit capacitor is not reached after a time period, beginning at a start of the charge process, has elasped that is substantially shorter than a time required by the intermediate circuit capacitor to reach a full charge;
  wherein the ending is performed by an arrangement that includes a first monoflop having a first time constant and a second monoflop having a second time constant, inputs of the first monoflop and the second monoflop connected to receive a charge signal.

* * * * *